United States Patent
Matsumura et al.

(10) Patent No.: US 7,658,972 B2
(45) Date of Patent: Feb. 9, 2010

(54) SILICONE EMULSION COMPOSITION AND WOOD TREATMENT

(75) Inventors: Kazuyuki Matsumura, Annaka (JP); Akira Yamamoto, Annaka (JP)

(73) Assignee: Shin-Etsu Chemical Co., Ltd., Tokyo (JP)

( * ) Notice: Subject to any disclaimer, the term of this patent is extended or adjusted under 35 U.S.C. 154(b) by 470 days.

(21) Appl. No.: 11/500,913

(22) Filed: Aug. 9, 2006

(65) Prior Publication Data
US 2007/0042124 A1 Feb. 22, 2007

(30) Foreign Application Priority Data
Aug. 19, 2005 (JP) .............................. 2005-238387

(51) Int. Cl.
*C08L 83/04* (2006.01)
*C08K 3/38* (2006.01)
(52) U.S. Cl. .................. 427/297; 427/440; 524/405; 528/12; 528/17; 528/21; 528/34
(58) Field of Classification Search ........................ None
See application file for complete search history.

(56) References Cited

U.S. PATENT DOCUMENTS 4,229,507 A 10/1980 Kai et al.
5,254,621 A * 10/1993 Inoue et al. .................. 524/837
5,534,305 A 7/1996 Fujiki et al.
6,147,157 A * 11/2000 Inokuchi et al. ............. 524/837
6,248,855 B1 * 6/2001 Dalle et al. ................... 528/26

FOREIGN PATENT DOCUMENTS

| JP | 54-110234 |   | 8/1979 |
| JP | 55-118044 | A | 9/1980 |
| JP | 56-4408 | A | 1/1981 |
| JP | 60-255866 | A | 12/1985 |
| JP | 63-265601 | A | 11/1988 |
| JP | 4-307204 | A | 10/1992 |
| JP | 5-69412 | A | 3/1993 |
| JP | 2003-327833 | * | 11/2003 |
| JP | 2005-325253 | * | 11/2003 |

OTHER PUBLICATIONS

Machine translation of JP 2003-327833.*
Machine translation of JP 2005-325253.*

* cited by examiner

*Primary Examiner*—Marc S Zimmer
(74) *Attorney, Agent, or Firm*—Birch, Stewart, Kolasch & Birch, LLP

(57) ABSTRACT

A silicone emulsion composition for wood treatment is prepared by emulsifying and dispersing (A) an organopolysiloxane, (B) the reaction product of an amino-containing organoxysilane and an acid anhydride, (C) an epoxy-containing organoxysilane, (D) colloidal silica and/or polysilsesquioxane, and (E) a curing catalyst in water to form a silicone emulsion, and adding and mixing (F) a boron compound with the silicone emulsion.

8 Claims, No Drawings

SILICONE EMULSION COMPOSITION AND WOOD TREATMENT

CROSS-REFERENCE TO RELATED APPLICATION

This non-provisional application claims priority under 35 U.S.C. §119(a) on Patent Application No. 2005-238387 filed in Japan on Aug. 19, 2005, the entire contents of which are hereby incorporated by reference.

TECHNICAL FIELD

This invention relates to a silicone emulsion composition in which a boron compound with rot-proof and termite-controlling functions is added to a silicone emulsion which crosslinks to form a rubbery coating. The silicone emulsion composition imparts, when wood is treated therewith just once, water repellency, water absorption prevention, dimensional stability, rot-proofness and termite control to wood without damaging wooden quality; improves the leachability in water of the rot-proof/termite-controlling agent; and has shelf stability. The invention also relates to a method of treating wood with the composition.

BACKGROUND ART

While wood is widely utilized as building materials, crafted products and the like, it is a common practice that wood is coated or impregnated with various treating agents such as high-molecular weight compounds, low-molecular weight compounds, chemical agents and inorganic materials for the purpose of improving wood properties such as dimensional stability, and resistances to water, staining, fire, rotting, crazing and wear.

Among these agents, many attempts have been made to apply to wood the silicones which have been proven effective as modifiers for paints and resins with respect to water repellence and resistance to staining. For example, JP-A 56-4408 discloses a method of coating a surface of wood with a composition comprising 100 pbw of a silicone diol having a relatively high viscosity and 0.1 to 50 pbw of a crosslinker, followed by curing. This method, however, detracts from the wooden quality on the wood surface, and has the drawback common to paints that the effect of protecting the wood interior disappears if the surface coating receives only a few flaws in the course of actual use of wood in various applications. When the above treatment is performed on the wood which has been internally impregnated with inorganic salts of phosphoric or boric acid serving as flame retardants or termite-controlling agents, undesirably the coating permits the inorganic salts to be readily leached out in rain water or the like.

Intending to apply the sol-gel method using silicon alkoxide to wood, JP-A 63-265601 discloses a method of preparing a modified wood by forming a silicone polymer within cell walls of wood. This method capable of forming a silicone polymer within wood has advantages that the wooden quality on the surface is not compromised and the effect lasts even after the wood surface flaws. However, catalysts such as hydrochloric acid or organometallic compounds must be used to promote curing because of the low reactivity of monomers, leaving the problems that preparation requires cumbersome operation and costs and the wood itself can be degraded by the catalyst.

Additionally, the silicone polymer forms via catalytic reaction while filling wood cell cavities therewith. Then it is effective for prohibiting water absorption to some extent, but less effective for improving dimensional stability.

Beside the silicone, SBR latex is coated to wood surface as the anti-crazing agent as disclosed in JP-A 54-110234. Due to poor stability over time, the latex coating degrades upon outdoor exposure, failing to prevent the chemical agents from being leached out.

As the anti-crazing paint for wood, JP-A 60-255866 describes a coating composition comprising an SBR or NBR latex and a polyalkylene oxide group-containing compound, which is coated to wood surface. The polyalkylene oxide group-containing compound is hydrophilic so that it is leached out upon exposure to weather over time, and the effect does not last.

JP-A 55-118044 discloses a wood treating composition having a low-volatile oligomer emulsified in water. JP-A 5-69412 discloses a wood treating composition comprising a water-soluble modifier and an emulsion. Both the low-volatile oligomer and the water-soluble modifier are hydrophilic compounds which can be leached out with the lapse of time, failing to maintain the desired effect. JP-A 4-307204 discloses a wood processing composition comprising a water-soluble filling/curing agent which cures after having penetrated into wood so that it prevents chemical agents from being leached out and restrains the wood from shrinkage. The water-soluble filling/curing agent comprising volatile reagents such as urea and formalin requires careful management of the working environment, and the effect of preventing leaching-out is insufficient due to water solubility.

Another approach is to substitute a water-soluble solvent such as polyethylene glycol for the bound water in cell membranes. However, the solvent once substituted will be leached out over time due to its water solubility.

The above-discussed technology relates to surface treating agents for treating wood having rot-proof and termite controlling agents already impregnated therein. Then at least two steps are involved, and so the overall process is cumbersome and uneconomical.

SUMMARY OF THE INVENTION

An object of the present invention is to provide a silicone emulsion composition which imparts water repellency, water absorption prevention, dimensional stability, rot-proofness and termite control to wood through a single treatment, and minimizes the leachability in water of a rot-proof/termite-controlling agent; a method of treating wood using the composition.

The inventors have found that the above and other objects are achieved when a boron compound is added to and mixed with a silicone emulsion comprising the following components (A) to (E) emulsified and dispersed in water, which crosslinks to form a rubbery coating. Unexpectedly, the boron compound can be effectively admixed with the silicone emulsion in a stable manner, and the resulting silicone emulsion composition imparts water repellency, water absorption prevention, dimensional stability, rot-proofness and termite control to wood through a single treatment, and minimizes the leachability in water of the rot-proof/termite-controlling agent.

The invention provides a silicone emulsion composition comprising a silicone emulsion comprising the following components (A) to (E) emulsified and dispersed in water, (A) 100 parts by weight of an organopolysiloxane having at least two silicon-bonded hydroxyl groups on the molecule, (B) 0.5 to 20 parts by weight of the reaction product of an amino-containing organoxysilane and an acid anhydride, (C) 0 to 20 parts by weight of an epoxy-containing organoxysilane and/or a partial hydrolyzate thereof, (D) 0 to 50 parts by weight of colloidal silica and/or polysilsesquioxane, and (E) 0 to 10 parts by weight of a curing catalyst, the composition further comprising (F) a boron compound added to and mixed with the silicone emulsion in an amount of 0.1 to 300 parts by weight per 100 parts by weight as solids of the silicone emulsion. Typically, the boron compound (F) is a boric acid salt.

In another embodiment, wood is treated with the silicone emulsion composition by surface treatment, immersion treatment, or vacuum or pressure impregnation.

BENEFITS OF THE INVENTION

By treating wood just once, the silicone emulsion composition of the invention imparts excellent properties including water repellency, water absorption prevention, dimensional stability, rot-proofness and termite control to the wood without damaging the wooden quality. The composition minimizes the leachability in water of the rot-proof/termite-controlling agent.

DESCRIPTION OF THE PREFERRED EMBODIMENTS

As used herein, the notation (Cn-Cm) means a group containing from n to m carbon atoms per group. All parts are by weight unless otherwise stated.

The silicone emulsion composition of the invention comprises a silicone emulsion comprising the following components (A) to (E) which are emulsified and dispersed in water, and (F) a boron compound. The respective components are described in detail.

Component (A) is an organopolysiloxane having at least two silicon-bonded hydroxyl groups on the molecule. The preferred organopolysiloxane has the general formula (1).

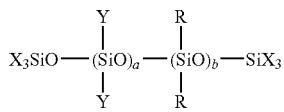

Herein R which may be the same or different is a $C_1$-$C_{20}$ alkyl group or $C_6$-$C_{20}$ aryl group; X which may be the same or different is a $C_1$-$C_{20}$ alkyl group, $C_6$-$C_{20}$ aryl group, $C_1$-$C_{20}$ alkoxy group or hydroxyl group; and Y which may be the same or different is X or a group —[O—Si(X)$_2$]$_c$—X. At least two of X and Y groups are hydroxyl groups. The subscript a is a number of 0 to 1,000, b is a positive number of 100 to 10,000, and c is a positive number of 1 to 1,000.

More particularly, in formula (1), R is each independently selected from $C_1$-$C_{20}$ alkyl groups and $C_6$-$C_{20}$ aryl groups, such as methyl, ethyl, propyl, butyl, pentyl, hexyl, heptyl, octyl, nonyl, decyl, dodecyl, tetradecyl, hexadecyl, octadecyl, cyclopentyl, cyclohexyl, cycloheptyl, phenyl, tolyl, and naphthyl, with methyl being preferred. X is each independently selected from $C_1$-$C_{20}$ alkyl groups, $C_6$-$C_{20}$ aryl groups, $C_1$-$C_{20}$ alkoxy groups and hydroxyl groups, such as methyl, ethyl, propyl, butyl, pentyl, hexyl, heptyl, octyl, nonyl, decyl, dodecyl, tetradecyl, hexadecyl, octadecyl, cyclopentyl, cyclohexyl, cycloheptyl, phenyl, tolyl, naphthyl, methoxy, ethoxy, propoxy, butoxy, hexyloxy, heptyloxy, octyloxy, decyloxy, and tetradecyloxy as well as hydroxyl. Y is each independently selected from X and groups —[O—Si(X)$_2$]$_c$—X wherein c is a positive number of 1 to 1,000. If "a" is more than 1,000, the resulting coating has insufficient strength. Thus "a" is a number of 0 to 1,000, preferably 0 to 200. If b is less than 100, the resulting coating becomes less flexible. If b is more than 10,000, the resulting coating has reduced tear strength. Thus b is a positive number of 100 to 10,000, preferably 1,000 to 5,000. For crosslinking, at least two silicon-bonded hydroxyl groups must be included on the molecule.

Illustrative examples of the organopolysiloxane are given below.

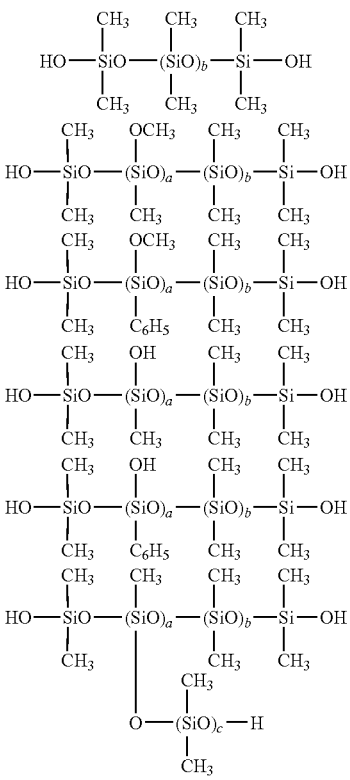

Herein, a, b and c are as defined above.

Such organopolysiloxane can be synthesized by well-known methods. For example, it is obtained through equilibration reaction between a cyclic siloxane such as octamethylcyclotetrasiloxane and an α,ω-dihydroxysiloxane oligomer in the presence of a catalyst such as a metal hydroxide. Since component (A) is preferably used in emulsion form, it may be prepared as an emulsion by a well-known emulsion polymerization method. Thus it may be readily synthesized by previously emulsifying and dispersing a cyclic siloxane or an α,ω-dihydroxysiloxane oligomer, an α,ω-dialkoxysiloxane oligomer, alkoxysilane or the like in water using an anionic or cationic surfactant, optionally adding a catalyst such as an acid or basic material, and effecting polymerization reaction.

The anionic or cationic surfactant used herein is not particularly limited. Examples include alkylsulfate salts, alkylbenzenesulfonate salts, alkylphosphate salts, polyoxyethylene alkylsulfate salts, alkylamine hydrogen chloride salts, and alkylamine acetate salts. The surfactant is usually used in an amount of about 0.1 to 20% by weight based on the siloxane(s).

Examples of the catalysts such as acid and basic materials include sulfuric acid, hydrochloric acid, phosphoric acid, acetic acid, formic acid, lactic acid, trifluoroacetic acid, potassium hydroxide, sodium hydroxide, and ammonia. They may be used in catalytic amounts. Where acidic materials like alkylbenzenesulfonates, alkylsulfates and alkylphosphates are used as the surfactant, the catalyst is unnecessary.

Component (B) is the reaction product of an amino-containing organoxysilane and an acid anhydride, which serves to improve the adhesion of a silicone coating to the substrate or wood. The product is obtained preferably by reacting an amino-containing alkoxysilane with a dicarboxylic acid anhydride. The amino-containing alkoxysilane as one reactant has the general formula.

$$A(R)_g Si(OR)_{3-g}$$

Herein R is as defined above, A is an amino-containing group of the formula —$R^1(NHR^1)_n NHR^2$ wherein $R^1$ is each independently a divalent hydrocarbon group of 1 to 6 carbon atoms, $R^2$ is R or hydrogen, h is an integer of 0 to 6, and g is 0, 1 or 2. Illustrative examples of the amino-containing alkoxysilane are given below.

$(C_2H_5O)_3SiC_3H_6NH_2$
$(C_2H_5O)_2(CH_3)SiC_3H_6NH_2$
$(CH_3O)_3SiC_3H_6NH_2$
$(CH_3O)_2(CH_3)SiC_3H_6NH_2$
$(CH_3O)_3SiC_3H_6NHC_2H_4NH_2$
$(CH_3O)_2(CH_3)SiC_3H_6NHC_2H_4NH_2$

Examples of the dicarboxylic anhydride for reaction with the amino-containing organoxysilane include maleic anhydride, phthalic anhydride, succinic anhydride, methylsuccinic anhydride, glutaric anhydride, and itaconic anhydride, with maleic anhydride being preferred.

The reaction is performed simply by mixing the amino-containing organoxysilane with the acid anhydride in such amounts that a molar ratio of amino groups to acid anhydride is 0.5-2:1, especially 0.8-1.5:1, optionally in a hydrophilic organic solvent, at room temperature or elevated temperature. Suitable hydrophilic organic solvents, if used, include alcohols such as methanol, ethanol, isopropanol and butanol, ketones such as acetone and methyl ethyl ketone, acetonitrile, and tetrahydrofuran. The amount of hydrophilic organic solvent used is 0 to about 100% by weight of the reaction product.

An appropriate amount of component (B) is 0.5 to 20 parts by weight per 100 parts by weight of component (A). Less than 0.5 part of component (B) fails to improve the adhesion to wood whereas more than 20 parts of component (B) makes the coating hard and brittle. The preferred amount of component (B) is 1 to 10 parts by weight.

It is noted that when the reaction of amino-containing organoalkoxysilane with dicarboxylic acid anhydride is carried out in a hydrophilic organic solvent, the reaction solution may be used as component (B) directly or after the solvent is stripped off.

Component (C) is an epoxy-containing organoxysilane and/or a partial hydrolyzate thereof, which serves to improve the adhesion of a silicone coating to the substrate or wood. Examples include γ-glycidoxypropyltrimethoxysilane, γ-glycidoxypropyldimethoxymethylsilane, β-(3,4-epoxycyclohexyl)ethyltrimethoxysilane, and β-(3,4-epoxycyclohexyl)ethyldimethoxymethylsilane. Partial hydrolyzates of these silanes are also included.

An appropriate amount of component (C) is 0 to 20 parts by weight per 100 parts by weight of component (A). More than 20 parts of component (C) makes the coating hard and brittle. The preferred amount of component (C) is 0 to 20 parts by weight. When used, the amount of component (C) is preferably at least 1 part by weight.

Component (D) is colloidal silica and/or polysilsesquioxane, which serves as a coating reinforcement. Examples include colloidal silica and polymethylsilsesquioxane which is a hydrolytic condensate of trimethoxymethylsilane.

Some colloidal silicas which can be used herein are commercially available. While the type is not critical, those colloidal silicas stabilized with sodium, ammonium or aluminum and having an average particle size of 5 to 50 nm are preferable. Suitable commercial examples include Snowtex by Nissan Chemical Industries, Ltd., Ludox by Dupont, Silicadol by Nippon Chemical Industrial Co., Ltd., Adelite AT by Asahi Denka Co., Ltd., and Cataloid S by Catalysts & Chemicals Industries Co., Ltd.

Polymethylsilsesquioxane is obtained by adding an acid such as sulfuric acid or a basic compound such as potassium hydroxide as a condensation catalyst to an aqueous solution of a surfactant, adding dropwise trimethoxymethylsilane thereto, and stirring the mixture, thereby yielding an emulsion of polymethylsilsesquioxane. In this reaction, it is acceptable to add an alkoxytrialkylsilane, dialkoxydialkylsilane, tetraalkoxysilane or the like for adjusting the degree of crosslinking of polysilsesquioxane. It is also acceptable to add a vinylsilane, epoxysilane, acrylic silane, methacrylic silane or the like for enhancing the reactivity of polysilsesquioxane.

An appropriate amount of component (D) is 0 to 50 parts by weight per 100 parts by weight of component (A). More than 50 parts of component (D) makes the silicone coating hard and brittle. The preferred amount of component (D) is 0 to 30 parts by weight. When used, the amount of component (D) is preferably at least 10 parts by weight.

Also preferably component (D) has an average particle size of 2 to 200 nm, more preferably 5 to 100 nm. It is noted that the average particle size is measured by the BET method.

Component (E) is a curing catalyst for inducing condensation reaction of the components of the composition for achieving quick crosslinking and curing. Suitable catalysts include metal salts of organic acids such as dibutyltin dilaurate, dibutyltin dioctate, dioctyltin dilaurate, dioctyltin diversatate, dioctyltin diacetate, dibutyltin bisoleylmaleate, tin octylate, zinc stearate, zinc octylate, zinc acetate and iron octylate; and amine compounds such as n-hexylamine and guanidine. These curing catalysts except water-soluble ones are desirably emulsified and dispersed in water with the aid of surfactants to form emulsions, prior to use.

An appropriate amount of component (E) is 0 to 10 parts by weight per 100 parts by weight of component (A). If more than 10 parts of the catalyst is used, a portion thereof can be left in the coating as non-volatile matter and adversely affect the coating properties. The preferred amount of component (E) is 0 to 5 parts by weight. When used, the amount of component (E) is preferably at least 0.5 part by weight.

In the silicone emulsion thus formulated, silane coupling agents, silicone resins, silicone oils, or powdered silicone resins may be added and compounded, if desired, for further improving the properties of a coating thereof, as long as the objects of the invention are not compromised. Suitable silane coupling agents include various silanes having acryloxy, methacryloxy, mercapto, carboxyl and cyano groups. Suitable silicone resins are trialkylsiloxypolysilicates. Suitable silicone oils include α,ω-dihydroxyalkylpolysiloxanes and alkylpolysiloxanes. Suitable powdered silicone resins include silicone resin powder and silicone rubber powder.

According to the invention, (F) a boron compound is added to and mixed with the silicone emulsion in an amount of 0.1 to 300 parts by weight per 100 parts by weight as solids of the silicone emulsion to formulate a silicone emulsion composition. The boron compound imparts rot-proof and termite-controlling properties to wood.

Suitable boron compounds include boric acid, borax, borates ($Na_2B_8O_{13} \cdot 4H_2O$) such as Tim-bor® available from U.S. Borax Inc., and trialkyl borates such as trimethyl borate, triethyl borate, tripropyl borate and tributyl borate. Of these, borax and borates such as Tim-bor® are preferred.

The amount of the boron compound (F) compounded is 0.1 to 300 parts by weight, preferably 100 to 300 parts by weight per 100 parts by weight as solids of the silicone emulsion. Less than 0.1 pbw of component (F) achieves less rot-proof and termite-controlling effects whereas more than 300 pbw detracts from the emulsion stability.

In combining the silicone emulsion with component (F), it is preferred that component (F) be dissolved in water and in the aqueous solution form added to and mixed with the silicone emulsion. In this preferred procedure, the amount of water in which component (F) is dissolved is such that the concentration of component (F) is at least 10% by weight.

In the silicone emulsion composition, various additives may be compounded if desired, such as, for example, thickeners, pigments, dyes, penetrants, antistatic agents, antifoaming agents, flame retardants, antibacterial agents, and water repellents.

The wood which can be treated with the silicone emulsion composition of the invention is not particularly limited and encompasses a variety of woods including solid wood, plywood, laminated veneer lumbers (LVL), and particle boards.

A coating of the silicone emulsion composition of the invention is effective for preventing water absorption and has a good ability to conform to the substrate due to rubbery quality, suggesting that it is unsusceptible to cracking. The coating is thus effective in preventing the rot-proof/termite-controlling agent from being leached out in water, typically rain water.

The method of applying the silicone emulsion composition of the invention is not critical. Well-known methods that can be used herein include surface treatment such as brush coating, roll coating, and spray coating, immersion treatment, and vacuum or pressure impregnation. Once the silicone emulsion composition is applied, it is dried at normal temperature, forming a cured coating. The processing time can be reduced by heating for promoting the cure. The cured coating has rubbery quality.

EXAMPLE

Preparation Examples, Examples and Use Examples are given below for further illustrating the present invention. These examples should not be construed as limiting the invention. Unless otherwise stated, parts and percents are by weight. The viscosity is measured by a rotational viscometer.

Preparation Example 1

A 2-L polyethylene beaker was charged with 498 g of octamethylcyclotetrasiloxane, 2 g of triethoxyphenylsilane, 50 g of 10% sodium laurylsulfate aqueous solution and 50 g of 10% dodecylbenzenesulfonate aqueous solution, which were homogeneously emulsified using a homomixer. Water, 400 g, was slowly added for dilution, and the diluted liquid passed twice through a high-pressure homogenizer under a pressure of 300 kg/cm$^2$, yielding a homogeneous white emulsion. This emulsion was transferred to a 2-L glass flask equipped with a stirrer, thermometer and reflux condenser, where it was subjected to polymerization reaction at 50° C. for 24 hours, and aging at 10° C. for 24 hours. This was followed by neutralization to pH 6.2 with 12 g of 10% sodium carbonate aqueous solution. The emulsion thus obtained had a nonvolatile content of 45.4% upon drying at 105° C. for 3 hours, and contained a non-flowing, soft gel-like organopolysiloxane having an average composition represented by $[(CH_3)_2SiO_{2/2}]/[(C_6H_5)SiO_{3/2}]=100/0.1$ (molar ratio) and end-capped with hydroxyl groups. In this way, an emulsion [A-1] containing 44.4% component (A) was obtained.

Preparation Example 2

A 2-L polyethylene beaker was charged with 500 g of octamethylcyclotetrasiloxane, 50 g of 10% sodium laurylsulfate aqueous solution and 50 g of 10% dodecylbenzenesulfonate aqueous solution, which were homogeneously emulsified using a homomixer. Water, 400 g, was slowly added for dilution, and the diluted liquid passed twice through a high-pressure homogenizer under a pressure of 300 kg/cm$^2$, yielding a homogeneous white emulsion. This emulsion was transferred to a 2-L glass flask equipped with a stirrer, thermometer and reflux condenser, where it was subjected to polymerization reaction at 50° C. for 24 hours, and aging at 10° C. for 24 hours. This was followed by neutralization to pH 6.2 with 12 g of 10% sodium carbonate aqueous solution. The emulsion thus obtained had a nonvolatile content of 45.5% upon drying at 105° C. for 3 hours, and contained a gum-like organopolysiloxane of the formula HO—$[(CH_3)_2SiO]_n$—H having a viscosity of at least 1,000 Pa·s at 25° C. In this way, an emulsion [A-2] containing 44.5% component (A) was obtained.

Preparation Example 3

Maleic anhydride, 154 g, was dissolved in 500 g of ethanol, after which 346 g of 3-aminopropyltriethoxysilane was added dropwise at room temperature over one hour. Reaction was performed under ethanol reflux at 80° C. for 24 hours, yielding a pale yellow clear solution [B-1] containing 50% of component (B). This solution had a nonvolatile content of 45.1% upon drying at 105° C. for 3 hours. The reaction product in the solution consisted of about 60% of a mixture of $(C_2H_5O)_3SiC_3H_6$—NHCO—CH=CHCOOH and $(C_2H_5O)_3SiC_3H_6NH_3{}^+$ $^-$OCOCH=CHCOOC$_2$H$_5$ and the remainder (about 40%) of oligomers derived therefrom, as analyzed by IR, GC, NMR and GCMS.

Preparation Example 4

A 2-L polyethylene beaker was charged with 300 g of dioctyltin dilaurate and 50 g of polyoxyethylene nonyl phenyl ether (EO 10 mole addition product), which were homogeneously mixed using a homomixer. Water, 650 g, was slowly added for achieving emulsion dispersion in water, and the dispersion passed twice through a high-pressure homogenizer under a pressure of 300 kg/cm$^2$, yielding an emulsion [E-1] containing 30% of component (E).

Preparation Example 5

A borate (Na$_2$B$_8$O$_{13}$.4H$_2$O) available as Tim-bor® from U.S. Borax Inc., 15 g, was combined with and dissolved in 85 g of deionized water, forming a 15% aqueous solution of the borate as component (F).

A series of silicone emulsions #1 to #7 were prepared by blending components (A) to (E) in accordance with the formulation (expressed in net weight) shown in Table 1. Note that γ-glycidoxypropyltrimethoxysilane [C-1] and colloidal silica (Snowtex C by Nissan Chemical Industries, Ltd., active ingredient 20%) [D-1] were used as components (C) and (D), respectively. With stirring, 4 g of carboxymethyl cellulose (Cellogen F-SA by Dai-Ichi Kogyo Seiyaku Co., Ltd.) was added to 500 g of the silicone emulsions for adjusting to a viscosity of 15 Pa·s at 25° C.

TABLE 1

| Silicone emulsion | | #1 | #2 | #3 | #4 | #5 | #6 | #7 |
|---|---|---|---|---|---|---|---|---|
| Component A | A-1 | 100 | — | 100 | 100 | — | 100 | — |
|  | A-2 | — | 100 | — | — | 100 | — | 100 |
| Component B | B-1 | 5 | 8 | 10 | 20 | 0.5 | 0.5 | 5 |
| Component C | C-1 | 5 | 8 | — | — | 20 | 2 | 5 |
| Component D | D-1 | 15 | — | 10 | — | — | 50 | 15 |
| Component E | E-1 | 1 | 0.5 | 1 | 1 | 1 | — | 0.1 |

Mixing formulation (net weight: pbw)

Examples 1-7

Silicone emulsion compositions #1 to #7 were prepared by adding and mixing component (F) with the silicone emulsions #1 to #7. The mixing formulation is shown in Table 2. These compositions were held for 3 months at room temperature, after which their stability was examined. The liquid is rated good (○) for no appearance change, fair (Δ) for some separation, and poor (X) for precipitation and separation. The results are also shown in Table 2.

TABLE 2

| | Mixing formulation (unit: pbw) | | | | | | |
|---|---|---|---|---|---|---|---|
| | Example 1 Silicone emulsion composition #1 | Example 2 Silicone emulsion composition #2 | Example 3 Silicone emulsion composition #3 | Example 4 Silicone emulsion composition #4 | Example 5 Silicone emulsion composition #5 | Example 6 Silicone emulsion composition #6 | Example 7 Silicone emulsion composition #7 |
| Silicone emulsion #1 | 100 | | | | | | |
| Silicone emulsion #2 | | 100 | | | | | |
| Silicone emulsion #3 | | | 100 | | | | |
| Silicone emulsion #4 | | | | 100 | | | |
| Silicone emulsion #5 | | | | | 100 | | |
| Silicone emulsion #6 | | | | | | 100 | |
| Silicone emulsion #7 | | | | | | | 100 |
| 15% component (F) in water | 300 | 300 | 150 | 700 | 300 | 300 | 300 |
| Shelf stability after 3 months | ○ | ○ | ○ | ○ | ○ | ○ | ○ |

Use Example 1

Three cedar sap wood pieces (air dried) of 1.4 cm×3 cm×3 cm (butt end 1.4×3 cm) were immersed in Silicone emulsion composition #1 at normal temperature and atmospheric pressure for 10 minutes and dried at 25° C. for 7 days, obtaining modified wood pieces. A water absorption test was carried out on these samples as follows. The results are shown in Table 3.

Water Absorption Test

The samples were entirely immersed in water for 24 hours, after which they were taken out and weighed. A percent water absorption was calculated according to the equation:

$$\% \text{ water absorption} = [(W - W0)/W0] \times 100$$

wherein W0 is the weight (g) of the sample before water immersion and W is the weight (g) of the sample immediately after water immersion. An average of three samples was reported.

Use Examples 2 to 7

Using Silicone emulsion compositions #2 to #7, a water absorption test was carried out as in Use Example 1. The results are shown in Table 3.

Comparative Use Example 1

Using untreated cedar sap wood pieces of the same size as in Use Example 1, a water absorption test was carried out as in Use Example 1. The results are shown in Table 3.

Comparative Use Example 2

Using the 15% aqueous solution of borate as component (F), test samples were prepared as in Use Example 1. A water absorption test was similarly carried out. The results are shown in Table 3.

Comparative Use Example 3

A reactor equipped with a thermometer, stirrer, reflux condenser and addition funnel was charged with 2.0 g of a reactive emulsifier (Adeka Reasoap SE-10N, Asahi Denka Co., Ltd.) and 342.1 g of water and heated to a temperature of 75° C. An emulsion was prepared by adding 2.0 g of a reactive emulsifier (Adeka Reasoap SE-10N, Asahi Denka Co., Ltd.) to 244.5 g of water, dissolving the emulsifier, further adding a mixture of unsaturated monomers: 230 g of 2-ethylhexyl acrylate, 230 g of styrene, 19 g of glycidyl methacrylate, and 12.5 g of methacrylic acid, and stirring the contents for emulsification. This emulsion was charged to the addition funnel. A 5% portion of this monomer mixture emulsion was transferred to the reactor, and 0.5 g of potassium persulfate added as a polymerization initiator, after which the reactor was heated to 80° C. and held for 10 minutes. Thereafter, the remainder of the monomer mixture emulsion and 50.0 g of 3% potassium persulfate were evenly added dropwise to the reactor over 3 hours. After the completion of addition, the mixture was held at 80° C. for one hour for maturing reaction. It was cooled to room temperature and neutralized with 3.5 g of aqueous ammonia. There was obtained Emulsion #8 having a solid concentration of 45%. To 100 parts of Emulsion #8 was added 300 parts of the 15% aqueous solution of borate as component (F). After mixing, however, precipitates settled out in the liquid.

TABLE 3

Water absorption after 24 hours

| Treating agent | Water absorption (%) |
| --- | --- |
| Use Example 1 | Silicone emulsion composition #1 | 22 |
| Use Example 2 | Silicone emulsion composition #2 | 21 |
| Use Example 3 | Silicone emulsion composition #3 | 19 |
| Use Example 4 | Silicone emulsion composition #4 | 25 |
| Use Example 5 | Silicone emulsion composition #5 | 20 |
| Use Example 6 | Silicone emulsion composition #6 | 22 |
| Use Example 7 | Silicone emulsion composition #7 | 23 |
| Comparative Use Example 1 | — | 123 |
| Comparative Use Example 2 | 15% component (F) in water | 145 |

Use Example 8

Nine cedar sap wood pieces having a butt section of 20 mm×20 mm and a height of 10 mm with opposed sides of straight grain were immersed in a 10-fold dilution in deionized water of Silicone emulsion composition #1 of Example 1 under reduced pressure for 2 hours, and dried at 25° C. for 7 days, obtaining test wood pieces.

A leach-out test was carried out on these samples according to JIS K1571. The amount of residual borate was determined by measuring the amount of boron in the samples after the test by the following procedure. The results are shown in Table 4.

Leach-Out Test

A set of nine wood samples was placed in a 500-ml beaker, to which deionized water in a volume which was 10 times the volume of the samples was poured so that the samples were submerged under the water surface. By installing a magnetic stirrer and rotating the stir bar at 400-450 rpm, the water was stirred at a temperature of 25° C. for 8 hours for leaching out the chemical. Immediately thereafter, the samples were taken out and lightly drained of water from the surface. Subsequently, the samples were held in an air circulating dryer at a temperature of 60° C. for 16 hours, allowing the volatiles to volatilize off. The foregoing procedure was repeated ten times.

Measurement of Residual Borate in Sample

The wood sample was placed in a Teflon® beaker, which received 50 ml of 3% aqueous nitric acid and was heated on a hot plate at 200° C. for 2 hours. The beaker was cooled down, after which water was added to a constant volume of 50 ml. This procedure was repeated five times. At the end of every procedure, the amount of boron was measured by an ICP analyzer. The total of these amounts is the amount of residual borate in the wood sample. The result is an average of nine samples.

Use Examples 9 to 14

The leach-out test and the residual borate measurement were carried out as in Use Example 8, using 10-fold dilutions in deionized water of Silicone emulsion compositions #2 to #7. The results are shown in Table 4.

Comparative Use Example 4

The leach-out test and the residual borate measurement were carried out as in Use Example 8, using the 15% aqueous solution of borate as component (F). The results are shown in Table 4.

TABLE 4

| | Treating agent | Amount of residual borate (kg/m$^3$) |
| --- | --- | --- |
| Use Example 8 | Silicone emulsion composition #1 | 2.3 |
| Use Example 9 | Silicone emulsion composition #2 | 2.2 |
| Use Example 10 | Silicone emulsion composition #3 | 1.8 |
| Use Example 11 | Silicone emulsion composition #4 | 2.9 |
| Use Example 12 | Silicone emulsion composition #5 | 2.1 |
| Use Example 13 | Silicone emulsion composition #6 | 2.4 |
| Use Example 14 | Silicone emulsion composition #7 | 2.2 |
| Comparative Use Example 4 | 15% component (F) in water | 0.01 |

Japanese Patent Application No. 2005-238387 is incorporated herein by reference.

Although some preferred embodiments have been described, many modifications and variations may be made thereto in light of the above teachings. It is therefore to be understood that the invention may be practiced otherwise than as specifically described without departing from the scope of the appended claims.

The invention claimed is:

1. A silicone emulsion composition comprising a silicone emulsion comprising the following components (A) to (E) emulsified and dispersed in water, (A) 100 parts by weight of an organopolysiloxane having at least two silicon-bonded hydroxyl groups on the molecule, (B) 0.5 to 20 parts by weight of the reaction product of an amino-containing organoxysilane and an acid anhydride, (C) 0 to 20 parts by weight of an epoxy-containing organoxysilane and/or a partial hydrolyzate thereof, (D) 0 to 50 parts by weight of colloidal silica and/or polysilsesquioxane, and (E) 0 to 10 parts by weight of a curing catalyst, said composition further comprising (F) a boric acid salt added to and mixed with said silicone emulsion in an amount of 0.1 to 300 parts by weight per 100 parts by weight as solids of said silicone emulsion.

2. A method of treating wood, comprising treating wood with the silicone emulsion composition of claim 1 by surface treatment, immersion treatment, or vacuum or pressure impregnation.

3. The silicone emulsion composition of claim 1, wherein component (A) is a organopolysiloxane of the formula

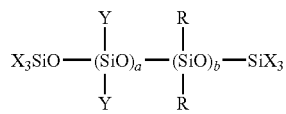

wherein: each R, which may be the same as or different from one another, is a $C_1$-$C_{20}$ alkyl group or $C_6$-$C_{20}$ aryl group; each X, which may be the same as or different from one another, is a $C_1$-$C_{20}$ alkyl group, $C_6$-$C_{20}$ aryl group, $C_1$-$C_{20}$ alkoxy group or hydroxyl group; each Y, which may be the same as or different from one another, is X or a group —[O—$Si(X)_2]_c$—X wherein the subscript a is a number of 0 to 1000, the subscript b is a positive number of 100 to 10,000, and the subscript c is a positive number of 1 to 1000; and at least two of the X and Y groups are hydroxyl groups.

4. The silicone emulsion composition of claim 1, wherein component (B) is the reaction product of an amino-containing organoxysilane selected from the group consisting of $(C_2H_5O)_3SiC_3H_6NH_2$, $(C_2H_5O)_2(CH_3)SiC_3H_6NH_2$, $(CH_3O)_3SiC_3H_6NH_2$, $(CH_3O)_2(CH_3)SiC_3H_6NH_2$, $(CH_3O)_3SiC_3H_6NHC_2H_4NH_2$, and $CH_3O)_2(CH_3)SiC_3H_6NHC_2H_4NH_2$ and an acid anhydride selected from the group consisting of maleic anhydride, phthalic anhydride, succinic anhydride, methylsuccinic anhydride, glutaric anhydride, and itaconic anhydride.

5. The silicone emulsion composition of claim 1, wherein component (C) is selected from the group consisting of γ-glycidoxypropyltrimethoxysilane, γ-glycidoxypropyldimethoxymethylsilane, β-(3,4-epoxycyclohexyl)ethyltrimethoxysilane, β-(3,4-epoxycyclohexyl)ethyldimethoxymethylsilane, and partial hydrolyzates thereof.

6. The silicone emulsion composition of claim 1, wherein component (D) is a colloidal silica stabilized with sodium, ammonium, or aluminum and having an average particle size of 5 to 50 nm.

7. The silicone emulsion composition of claim 1, wherein curing catalyst component (E) is selected from the group consisting of dibutyltin dilaurate, dibutyltin dioctate, dioctyltin dilaurate, dioctyltin diversatate, dioctyltin diacetate, dibutyltin bisoleylmaleate, tin octylate, zinc stearate, zinc octylate, zinc acetate, iron octylate, n-hexylamine, and guanidine.

8. The silicone emulsion composition of claim 1, wherein said composition comprises said boric acid salt (F) added to and mixed with said silicone emulsion in an amount of 100 to 300 parts by weight per 100 parts by weight as solids of said silicone emulsion.

* * * * *